(12) United States Patent
Hendon

(10) Patent No.: US 7,089,674 B1
(45) Date of Patent: Aug. 15, 2006

(54) ANGLE-MEASURING GAUGE FOR MOTORCYCLES AND THE LIKE

(76) Inventor: Burton D. Hendon, 3316 Park Lane Dr., Birmingham, AL (US) 35226

( * ) Notice: Subject to any disclaimer, the term of this patent is extended or adjusted under 35 U.S.C. 154(b) by 0 days.

(21) Appl. No.: 11/116,584

(22) Filed: Apr. 29, 2005

(51) Int. Cl.
*G01C 19/00* (2006.01)

(52) U.S. Cl. .............................. 33/330; 33/328; 73/104

(58) Field of Classification Search ................ 73/1.75, 73/7, 8, 9, 104, 105; 701/1, 4, 37, 38; 33/328, 33/330, 1 M, 1 N
See application file for complete search history.

(56) References Cited

U.S. PATENT DOCUMENTS

| | | | |
|---|---|---|---|
| 1,988,591 A | | 1/1935 | Gillmor |
| 2,260,396 A | | 10/1941 | Otto, Jr. |
| 3,208,155 A | | 9/1965 | Summers |
| 3,516,055 A | | 6/1970 | Snider |
| 3,983,746 A | * | 10/1976 | Phillips et al. ................ 73/105 |
| 4,231,257 A | * | 11/1980 | Yoshino et al. ............ 73/866.2 |
| 4,513,509 A | * | 4/1985 | Nordstrom .................... 33/330 |
| D310,040 S | | 8/1990 | Dibert |
| 5,132,906 A | * | 7/1992 | Sol et al. ....................... 701/80 |
| 5,446,658 A | * | 8/1995 | Pastor et al. ..................... 701/1 |
| 5,452,519 A | * | 9/1995 | Crocker et al. .......... 33/366.17 |
| 5,825,665 A | * | 10/1998 | Swift et al. .................. 702/154 |
| 6,935,035 B1 | * | 8/2005 | Smith .......................... 33/391 |
| 2005/0034315 A1 | * | 2/2005 | Smith .......................... 33/368 |

* cited by examiner

*Primary Examiner*—Eric S. McCall

(57) ABSTRACT

An angle measuring guide includes a housing having a plurality of monolithically formed walls and an annular opening formed within selected ones of the walls. The rear wall has a planar surface for being directly mated with the motorcycle. A transparent lens is monolithically formed with the housing and directly connected thereto. A buoyant member is situated within the opening and the cavity. A predetermined quantity of high viscous fluid is contained within the opening and the cavity such that the fluid freely flows therebetween and supports the buoyant member at a free and suspended position during operating conditions. The buoyant member includes a stationary weight member connected to a bottom portion thereof and thereby anchors the buoyant member while allowing the buoyant member to freely rotate about one or both of the x-axis and y-axis.

18 Claims, 4 Drawing Sheets

ANGLE-MEASURING GAUGE FOR MOTORCYCLES AND THE LIKE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to gyroscopes and, more particularly, to an angle measuring gauge for motorcycles and the like.

2. Prior Art

Attitude indicating instruments for aircraft and the like provide information about the pitch and roll attitudes of the carrying aircraft and may also provide information about its directional attitude or heading, and wherein the display of attitude information is in the form of a surface of revolution having delineations of regularly spaced meridians that maintain a vertical orientation in space and regularly spaced parallels transverse to the meridians, one of the parallels being an equator that divides the display into upper and lower halves and corresponds to a horizon.

In certain of its forms, such an attitude indicator has a spherical display that is gyro controlled so that regularly spaced meridians delineated on the spherical display are maintained in a vertical orientation in space and regularly spaced parallels that are transverse to the meridians are correspondingly maintained horizontal.

One of the delineated parallels is an equator that divides the displayed sphere into upper and lower hemispheres and corresponds to the horizon. Relatively fixed to the aircraft in substantially centered relation to the display is an indicator or reference that symbolizes the carrying aircraft and relates its attitude to the attitude of the delineated meridians and parallels on the displayed sphere. Typically this reference takes the form of a circle or dot that symbolizes the fuselage of the carrying aircraft to denote pitch and heading attitudes together with aligned horizontal dashes or bars at opposite sides of the circle or dot that symbolize the wings and show roll or banking attitude.

In level flight the airplane symbol is on the equator delineation of the spherical display, and attitudes of climb or dive are indicated by departures of the equator from that symbol, which departures correspond in direction and magnitude to the direction and magnitude of departure of the longitudinal axis of the aircraft from its normal level flight attitude. In like manner, roll attitudes are depicted by the angle between the equator and the wing symbols of the reference.

Thus, the equator of the spherical display provides a horizontal reference to which the pilot relates the attitude of the aircraft in the same way that he relates aircraft attitude to the natural horizon under visual flight conditions. The meridian delineations of the display can be marked in terms of compass headings and can be confined to fixed orientations in space so that the instrument can combine pitch and roll information with information that would otherwise have to be obtained from a separate directional gyro instrument.

Accordingly, a need remains for an apparatus that overcomes the above noted shortcomings and is applicable to motorcycles and other land or sea vehicles, and not limited to aircraft only. The present invention satisfies such a need by providing an angle measuring gauge that is self-contained and displays the degree of forward-aft or side-to-side inclination for a vehicle operator. Such a leveling gauge is intended for land, sea, and air applications and promptly displays the current orientation of the vehicle upon which it is mounted.

BRIEF SUMMARY OF THE INVENTION

In view of the foregoing background, it is therefore an object of the present invention to provide a measuring device for determining terrain slopes while operating a motorcycle. These and other objects, features, and advantages of the invention are provided by a housing having a plurality of monolithically formed walls sized and shaped for being removably attached directly to a selected portion of the motorcycle.

The housing further has an annular opening formed within selected ones of the walls in such a manner that the opening extends rearwardly from a front one of the walls and terminates anterior to a rear one of the walls. The rear wall has a planar surface for being directly mated with the motorcycle. A transparent lens is monolithically formed with the housing and directly connected thereto. The lens covers an entire surface area of the opening and is spaced forwardly of the rear wall. Such a lens protrudes away from the housing and defines a cavity in fluid communication with the opening.

A buoyant member is situated within the opening and the cavity. The buoyant member has surface indicia printed thereon for illustrating a plurality of degree-measuring markers defined about an x-axis and a y-axis. The buoyant member has a reference line registered at equilibrium when the housing is aligned with the x-axis and y-axis respectively. A predetermined quantity of high viscous fluid is contained within the opening and the cavity such that the fluid freely flows therebetween and supports the buoyant member at a free and suspended position during operating conditions.

The buoyant member includes a stationary weight member connected to a bottom portion thereof and thereby anchors the buoyant member while allowing the buoyant member to freely rotate about one or both of the x-axis and y-axis. Such a rotation about one of the x-axis and y-axis results from application of a torque to another of the x-axis and y-axis when the buoyant member is spinning so that the measuring device offers considerable opposition depending on an angular momentum of any torque that would change the direction of the axis of spin.

In one embodiment, the buoyant member has a spherical shape and the degree-measuring markers travel parallel to each other about an outer surface of the buoyant member. The degree-measuring markers have annular shapes and ranging between +90 and −90 degrees. The spherical buoyant member further rotates about a z-axis when torque is applied thereto. The reference line is stationary and centrally registered about an equator of the spherical buoyant member and is aligned with a zero degree marker of the degree-measuring markers when the measuring device is maintained at equilibrium.

In an alternate embodiment, the buoyant member has a disc shape and the degree-measuring markers are oriented along an annular path and ranging between zero and 180 as well as zero and −180 degrees. In such an embodiment, the reference line is mobile and pivotal and centrally connected to the buoyant member. The weight member is directly connected to the pivotal reference line in such a manner that the pivotal reference line rotates about a fulcrum axis when the housing is biased from equilibrium.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

Figure 1:
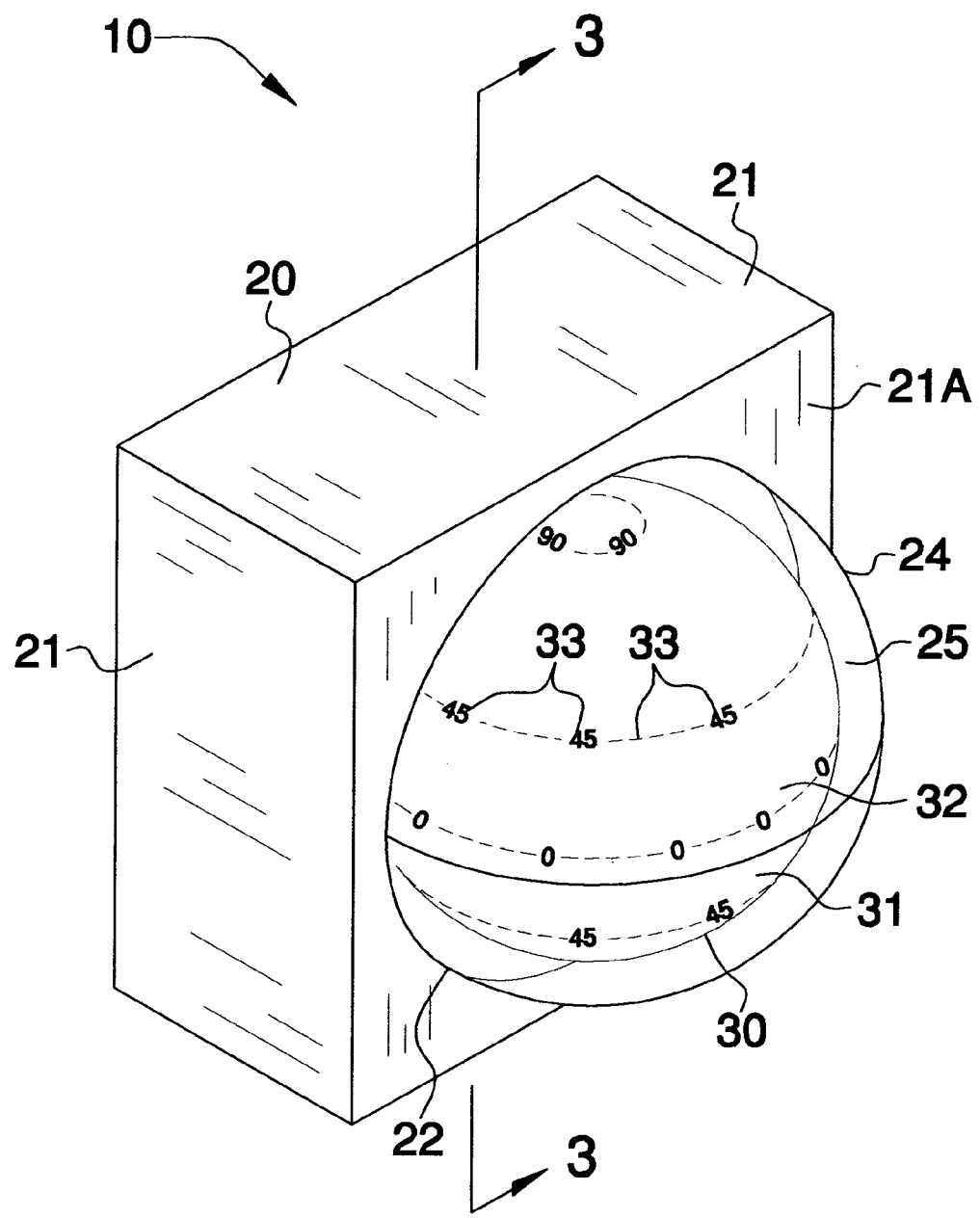
FIG. 1 is a perspective view showing a three-dimensional angle measuring gauge, in accordance with the present invention.
Figures 2, 7:
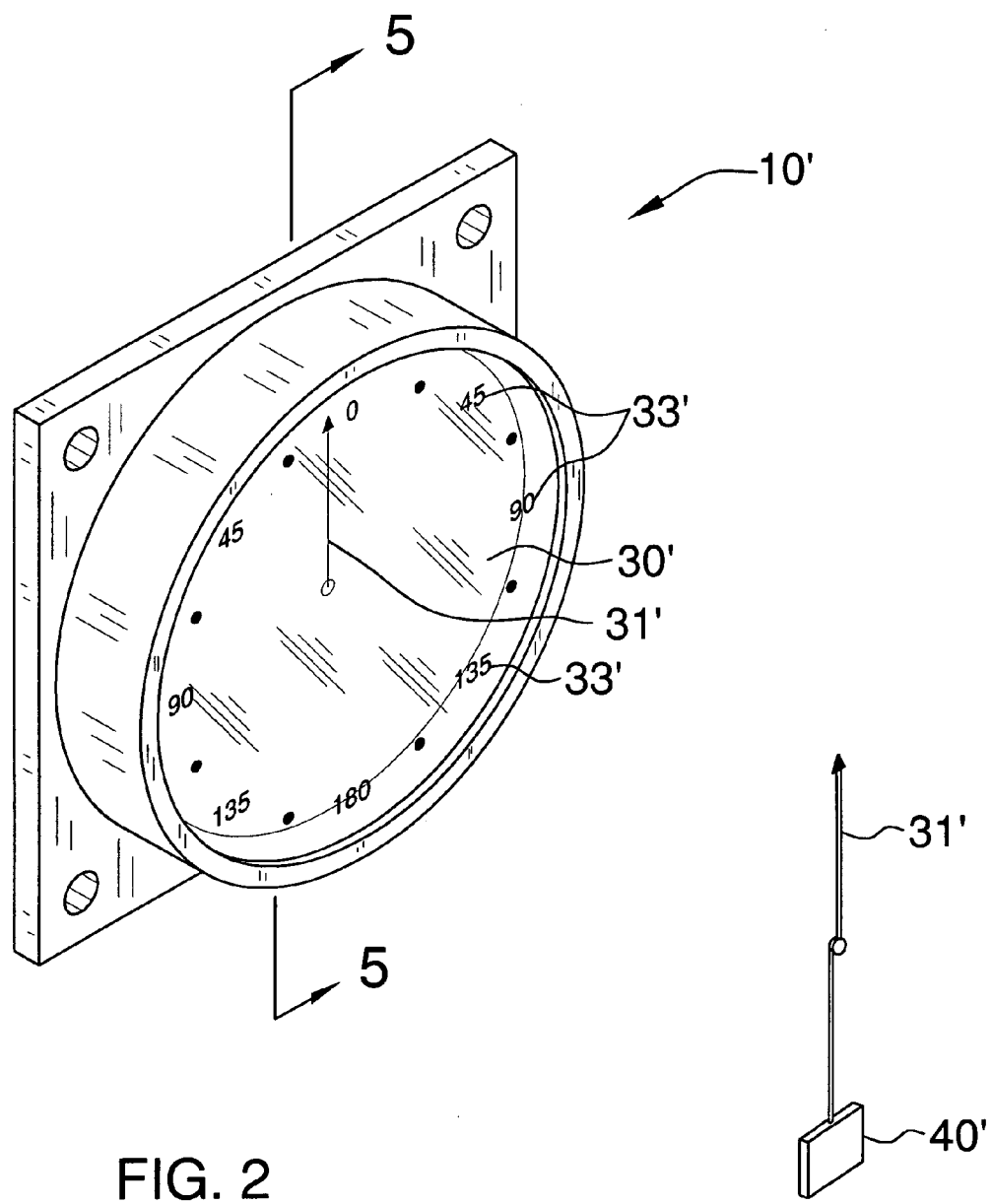
FIG. 2 is a perspective view showing an alternate embodiment of the present invention, illustrating a two-dimensional angle measuring gauge.
FIG. 7 is a perspective view of an alternate embodiment of the weight member and reference line.
Figure 3:
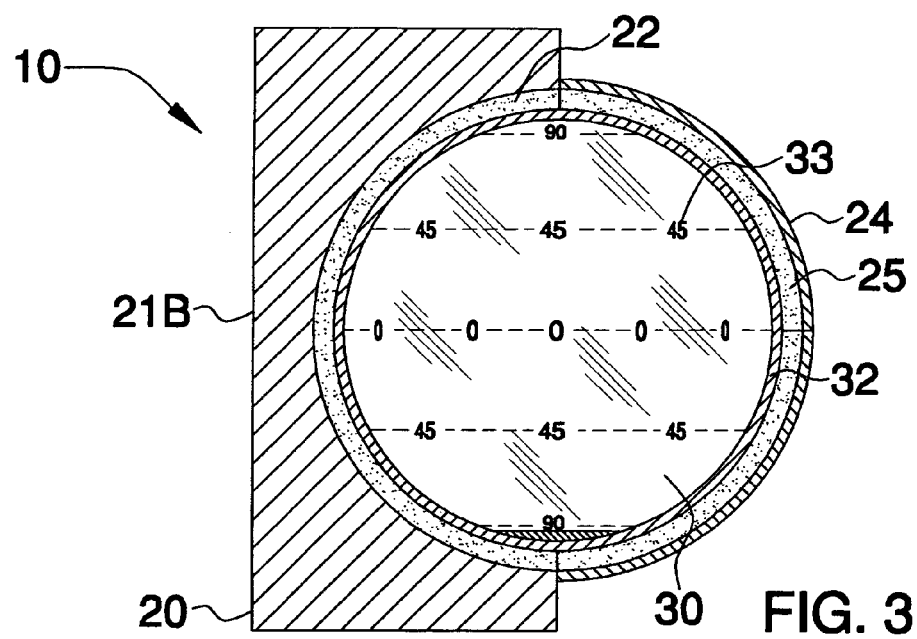
FIG. 3 is a cross-sectional view of the angle measuring gauge shown in FIG. 1, taken along line 3—3.
Figures 4A, 4B:
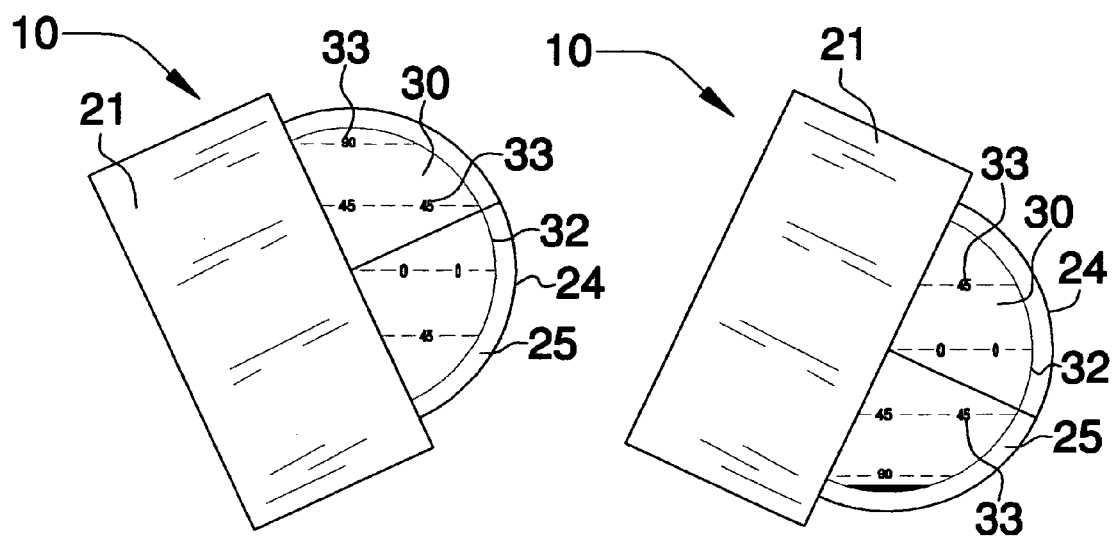
FIG. 4a is a side elevational view illustrating an upward tilting of the angle measuring gauge.
FIG. 4b is a side elevational view illustrating a downward tilting of the angle measuring gauge.
Figure 5:
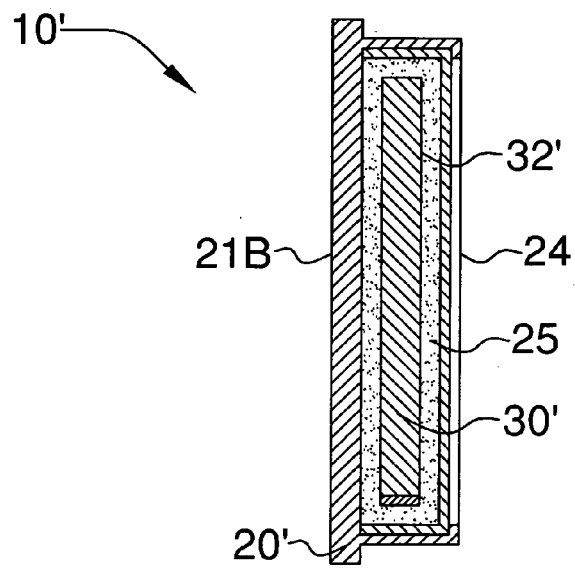
FIG. 5 is a cross-sectional view of the angle measuring gauge shown in FIG. 2, taken along line 5—5.
Figure 6A:
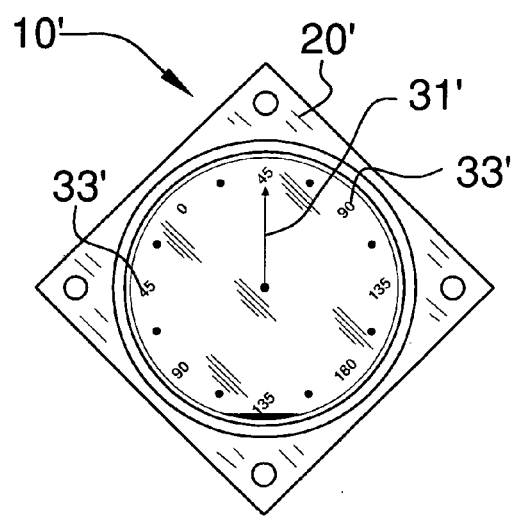
FIG. 6a is a front elevational view of the angle measuring device shown in FIG. 2 tilted 45 degrees to the left.
Figure 6B:
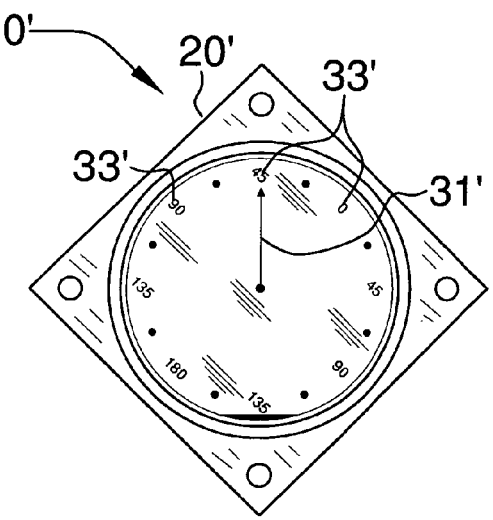
FIG. 6b is a front elevational view of the angle measuring device shown in FIG. 2 tilted 45 degrees to the right.

The apparatus of this invention is referred to generally in FIGS. 1–7 by the reference numeral 10 and is intended to provide a measuring device for determining terrain slopes while operating a motorcycle. It should be understood that the apparatus 10 may be used to measure angles in many different applications such as aircraft, and marine vessels, for example, and should not be limited in use to only motorcycles.

The apparatus 10 includes a housing 20 having a plurality of monolithically formed walls 21 sized and shaped for being removably attached directly to a selected portion of the motorcycle. Such a housing is preferably attached using an adhesive backing, as well known in the industry, but may be attached using hook and loop fasteners, such as VEL-CRO, or other common fasteners such as metal screws and nuts and bolts, as is obvious to one having ordinary skill in the art.

The housing 20 further has an annular opening 22 formed within selected ones of the walls 21 in such a manner that the opening 22 extends rearwardly from a front one 21A of the walls 21 and terminates anterior to a rear one 21B of the walls 21. The rear wall 21B has a planar surface for being directly mated, with no intervening elements, with the motorcycle. Such a planar rear wall 21b is critical to the operation of the apparatus 10 because it provides a planar surface that maintains the housing 20 at an even and stable position, thereby increasing the accuracy of the measurements.

A transparent lens 24 that is essential to proper viewing of the apparatus 10 is monolithically formed with the housing 20 and directly connected, with no intervening elements, thereto. The lens 24 covers an entire surface area of the opening 22 and is spaced forwardly of the rear wall 21B. Such a lens 24 protrudes away from the housing 20 and defines a cavity 25 in fluid communication with the opening 22.

A buoyant member 30 is situated within the opening 22 and the cavity 25. The buoyant member 30 has surface indicia printed thereon for illustrating a plurality of degree-measuring markers 33 defined about an x-axis and a y-axis. The buoyant member 30 has a reference line 31 registered at equilibrium when the housing 20 is aligned with the x-axis and y-axis respectively.

A predetermined quantity of highly viscous fluid is contained within the opening 22 and the cavity such that the fluid freely flows therebetween and supports the buoyant member 30 at a free and suspended position during operating conditions. Such a free floating position prevents the buoyant member from being damaged or mis-calibrated when the motorcycle encounters bumpy and uneven terrain.

The buoyant member 30 includes a stationary weight member 40 connected to a bottom portion thereof and thereby anchoring the buoyant member 30 while allowing the buoyant member 30 to freely rotate about one or both of the x-axis and y-axis. The weight member 40 is critical to the operation of the apparatus 10 because it provides a means of gravitational operation. Such a rotation about one of the x-axis and y-axis results from application of a torque to another of the x-axis and y-axis when the buoyant member 30 is spinning so that the measuring device 10 offers considerable opposition depending on an angular momentum of any torque that would change the direction of the axis of spin.

In one embodiment, the buoyant member 30 has a spherical shape and the degree-measuring markers 33 travel parallel to each other about an outer surface 32 of the buoyant member 30. The degree-measuring markers 33 have annular shapes and range between +90 and −90 degrees. In such a three-dimensional embodiment, the spherical buoyant member 30 further rotates about a z-axis when torque is applied thereto. Such a three dimensional apparatus 10 provides a user with information useful in determining the safe operating limits of the vehicle. Of course, such an apparatus 10 could also be used for trailers and tow vehicles, construction vehicles, parked trailer leveling, marine and aircraft vehicles, as is obvious to one having ordinary skill in the art. The reference line is stationary and centrally registered about an equator of the spherical buoyant member 30 and is aligned with a zero degree marker of the degree-measuring markers when the measuring device is maintained at equilibrium, enabling a user to always be certain the apparatus 10 is working properly.

In an alternate embodiment 10', the buoyant member 30' has a disc shape and the degree-measuring markers 33' are oriented along an annular path and ranging between zero and 180 as well as zero and −180 degrees. In such an embodiment, the reference line 31' is mobile and pivotal and centrally connected to the buoyant member 30'. The weight member 40' is directly connected, with no intervening elements, to the pivotal reference line 31' in such a manner that the pivotal reference line 31' rotates about a fulcrum axis when the housing 20' is biased from equilibrium. Such a two dimensional apparatus 10' provides a user with an angle of tilt either forward-aft or side-to-side.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A measuring device for determining terrain slopes while operating a motorcycle, said measuring device comprising:

a housing having a plurality of monolithically formed walls sized and shaped for being removably attached directly to a selected portion of the motorcycle, said housing further having an annular opening formed within selected ones of said walls in such a manner that the opening extends rearwardly from a front one of said walls and terminates anterior to a rear one of said walls;

a transparent lens monolithically formed with said housing and directly connected thereto, said lens covering an entire surface area of the opening and spaced forwardly of said rear wall, said lens protruding away from said housing and defining a cavity in fluid communication with the opening;

a buoyant member situated within the opening and the cavity, said buoyant member having surface indicia printed thereon for illustrating a plurality of degree-measuring markers defined about an x-axis and a y-axis, said buoyant member having a reference line registered at equilibrium when said housing is aligned with the x-axis and y-axis respectively; and a predetermined quantity of high viscous fluid contained within the opening and the cavity such that the fluid freely flows therebetween and supports said buoyant member at a free and suspended position during operating conditions;

wherein said buoyant member includes a weight member connected to a bottom portion thereof and thereby anchors said buoyant member while allowing said buoyant member to freely rotate about one or both of the x-axis and y-axis, the rotation about one of the x-axis and y-axis results from application of a torque to another of the x-axis and y-axis when said buoyant member is spinning so that said measuring device offers considerable opposition depending on an angular momentum of any torque that would change the direction of the axis of spin.

2. The measuring device of claim 1, wherein said buoyant member has a spherical shape and said degree-measuring markers travel parallel to each other about an outer surface of said buoyant member, said degree-measuring markers having annular shapes and ranging between +90 and −90 degrees.

3. The measuring device of claim 2, wherein said spherical buoyant member further rotates about a z-axis when torque is applied thereto.

4. The measuring device of claim 2, wherein said reference line is stationary and centrally registered about an equator of said spherical buoyant member and is aligned with a zero degree marker of said degree-measuring markers when said measuring device is maintained at equilibrium.

5. The measuring device of claim 1, wherein said buoyant member has a disc shape, said degree-measuring markers being oriented along an annular path and ranging between zero and 180 as well as zero and −180 degrees.

6. The measuring device of claim 1, wherein said reference line is mobile and pivotal and centrally connected to said buoyant member, said weight member being directly connected to said pivotal reference line in such a manner that said pivotal reference line rotates about a fulcrum axis when said housing is biased from equilibrium.

7. A measuring device for determining terrain slopes while operating a motorcycle, said measuring device comprising:

a housing having a plurality of monolithically formed walls sized and shaped for being removably attached directly to a selected portion of the motorcycle, said housing further having an annular opening formed within selected ones of said walls in such a manner that the opening extends rearwardly from a front one of said walls and terminates anterior to a rear one of said walls;

a transparent lens monolithically formed with said housing and directly connected thereto, said lens covering an entire surface area of the opening and spaced forwardly of said rear wall, said lens protruding away from said housing and defining a cavity in fluid communication with the opening;

a buoyant member situated within the opening and the cavity, said buoyant member having surface indicia printed thereon for illustrating a plurality of degree-measuring markers defined about an x-axis and a y-axis, said buoyant member having a reference line registered at equilibrium when said housing is aligned with the x-axis and y-axis respectively; and a predetermined quantity of high viscous fluid contained within the opening and the cavity such that the fluid freely flows therebetween and supports said buoyant member at a free and suspended position during operating conditions;

wherein said buoyant member includes a stationary weight member connected to a bottom portion thereof and thereby anchors said buoyant member while allowing said buoyant member to freely rotate about one or both of the x-axis and y-axis, the rotation about one of the x-axis and y-axis results from application of a torque to another of the x-axis and y-axis when said buoyant member is spinning so that said measuring device offers considerable opposition depending on an angular momentum of any torque that would change the direction of the axis of spin.

8. The measuring device of claim 7, wherein said buoyant member has a spherical shape and said degree-measuring markers travel parallel to each other about an outer surface of said buoyant member, said degree-measuring markers having annular shapes and ranging between +90 and −90 degrees.

9. The measuring device of claim 8, wherein said spherical buoyant member further rotates about a z-axis when torque is applied thereto.

10. The measuring device of claim 8, wherein said reference line is stationary and centrally registered about an equator of said spherical buoyant member and is aligned with a zero degree marker of said degree-measuring markers when said measuring device is maintained at equilibrium.

11. The measuring device of claim 7, wherein said buoyant member has a disc shape, said degree-measuring markers being oriented along an annular path and ranging between zero and 180 as well as zero and −180 degrees.

12. The measuring device of claim 7, wherein said reference line is mobile and pivotal and centrally connected to said buoyant member, said weight member being directly connected to said pivotal reference line in such a manner that said pivotal reference line rotates about a fulcrum axis when said housing is biased from equilibrium.

13. A measuring device for determining terrain slopes while operating a motorcycle, said measuring device comprising:

a housing having a plurality of monolithically formed walls sized and shaped for being removably attached directly to a selected portion of the motorcycle, said housing further having an annular opening formed within selected ones of said walls in such a manner that the opening extends rearwardly from a front one of said walls and terminates anterior to a rear one of said walls, said rear wall having a planar surface for being directly mated with the motorcycle;

a transparent lens monolithically formed with said housing and directly connected thereto, said lens covering an entire surface area of the opening and spaced forwardly of said rear wall, said lens protruding away from said housing and defining a cavity in fluid communication with the opening;

a buoyant member situated within the opening and the cavity, said buoyant member having surface indicia printed thereon for illustrating a plurality of degree-measuring markers defined about an x-axis and a y-axis, said buoyant member having a reference line registered at equilibrium when said housing is aligned with the x-axis and y-axis respectively; and a predetermined quantity of high viscous fluid contained within the opening and the cavity such that the fluid freely flows therebetween and supports said buoyant member at a free and suspended position during operating conditions;

wherein said buoyant member includes a stationary weight member connected to a bottom portion thereof and thereby anchors said buoyant member while allowing said buoyant member to freely rotate about one or both of the x-axis and y-axis, the rotation about one of the x-axis and y-axis results from application of a torque to another of the x-axis and y-axis when said buoyant member is spinning so that said measuring device offers considerable opposition depending on an angular momentum of any torque that would change the direction of the axis of spin.

14. The measuring device of claim 13, wherein said buoyant member has a spherical shape and said degree-measuring markers travel parallel to each other about an outer surface of said buoyant member, said degree-measuring markers having annular shapes and ranging between +90 and −90 degrees.

15. The measuring device of claim 14, wherein said spherical buoyant member further rotates about a z-axis when torque is applied thereto.

16. The measuring device of claim 14, wherein said reference line is stationary and centrally registered about an equator of said spherical buoyant member and is aligned with a zero degree marker of said degree-measuring markers when said measuring device is maintained at equilibrium.

17. The measuring device of claim 13, wherein said buoyant member has a disc shape, said degree-measuring markers being oriented along an annular path and ranging between zero and 180 as well as zero and −180 degrees.

18. The measuring device of claim 13, wherein said reference line is mobile and pivotal and centrally connected to said buoyant member, said weight member being directly connected to said pivotal reference line in such a manner that said pivotal reference line rotates about a fulcrum axis when said housing is biased from equilibrium.

\* \* \* \* \*